United States Patent
Humfeld et al.

(10) Patent No.: US 10,240,070 B1
(45) Date of Patent: Mar. 26, 2019

(54) ELECTRONICALLY REVERSIBLE ADHESIVE SYSTEMS

(71) Applicant: The Boeing Company, Chicago, IL (US)

(72) Inventors: Keith Daniel Humfeld, Federal Way, WA (US); Scott D. Hartshorn, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 15/705,566

(22) Filed: Sep. 15, 2017

(51) Int. Cl.
| | |
|---|---|
| *B32B 43/00* | (2006.01) |
| *C09J 9/02* | (2006.01) |
| *C09J 1/00* | (2006.01) |
| *C09J 5/00* | (2006.01) |
| *C09J 7/02* | (2006.01) |
| *B82Y 30/00* | (2011.01) |

(52) U.S. Cl.
CPC .............. *C09J 9/02* (2013.01); *B32B 43/006* (2013.01); *B82Y 30/00* (2013.01); *C09J 1/00* (2013.01); *C09J 5/00* (2013.01); *C09J 7/02* (2013.01); *C09J 2201/626* (2013.01); *C09J 2400/10* (2013.01)

(58) Field of Classification Search
CPC ................................................ C09J 2201/626
See application file for complete search history.

(56) References Cited

U.S. PATENT DOCUMENTS

| | | | | |
|---|---|---|---|---|
| 7,914,912 | B2 * | 3/2011 | Fearing | B81B 3/0032 428/141 |
| 9,505,955 | B1 | 11/2016 | Krahn et al. | |
| 2003/0208888 | A1 * | 11/2003 | Fearing | A44B 18/0003 24/442 |
| 2008/0280085 | A1 * | 11/2008 | Livne | C09J 7/20 428/40.1 |
| 2012/0237730 | A1 * | 9/2012 | Sitti | C09J 7/00 428/156 |
| 2014/0272272 | A1 * | 9/2014 | Spenko | C09J 9/00 428/113 |

OTHER PUBLICATIONS

Cui et al., "Mimicking a gecko's foot with strong adhesive strength based on a spinnable vertically aligned carbon nanotube array," *RSC Advances*, issue 18, vol. 4, pp. 9056-9060 (Abstract), Dec. 5, 2013.

(Continued)

*Primary Examiner* — Mark A Osele
(74) *Attorney, Agent, or Firm* — DASCENZO Intellectual Property Law, P.C.

(57) ABSTRACT

An adhesive system for attachment to a contact surface of an object comprises a backing, carbon nanotubes, charged nanoparticles, and an electrical source. The carbon nanotubes each have a first end region and a second end region, opposite the first end region. Each of the charged nanoparticles is coupled to the second end region of at least one of the carbon nanotubes. The electrical source is configured to selectively electrically charge the backing to cause an electrical repulsion force between the backing and the charged nanoparticles. The first end region of each of the carbon nanotubes is coupled to the backing. The second end region of each of a number of the carbon nanotubes is coupled to none of the charged nanoparticles.

22 Claims, 6 Drawing Sheets

(56) References Cited

OTHER PUBLICATIONS

Cui et al., "Mimicking Gecko Foot with Strong Adhesive Strength Based on Spinnable Vertically Aligned Carbon Nanotube Arrays," *RSC Advances*, 2014, electronic supplementary material, downloaded from http://www.rsc.org/suppdata/ra/c3/c3ra46113k/c3ra46113k.pdf.
Yang, "Engineers create new gecko-like adhesive that shakes off dirt," UC Berkeley Press Release, Sep. 10, 2008, downloaded from http://www.berkeley.edu/news/media/releases/2008/09/10_scgecko.shtml.
Krahn, *Design and development of functional dry adhesives and their applications*, thesis submitted to Simon Fraser University, Fall 2014.
Graule et al., "Perching and Takeoff of a Robotic Insect on Overhangs Using Switchable Electrostatic Adhesion," *Science*, vol. 352, No. 6288, pp. 978-982, May 20, 2016.
Eisenhaure et al., "A Review of the State of Dry Adhesives: Biomimetic Structures and the Alternative Designs They Inspire," *Micromachines*, vol. 8, No. 4, article 125, Apr. 14, 2017.

\* cited by examiner

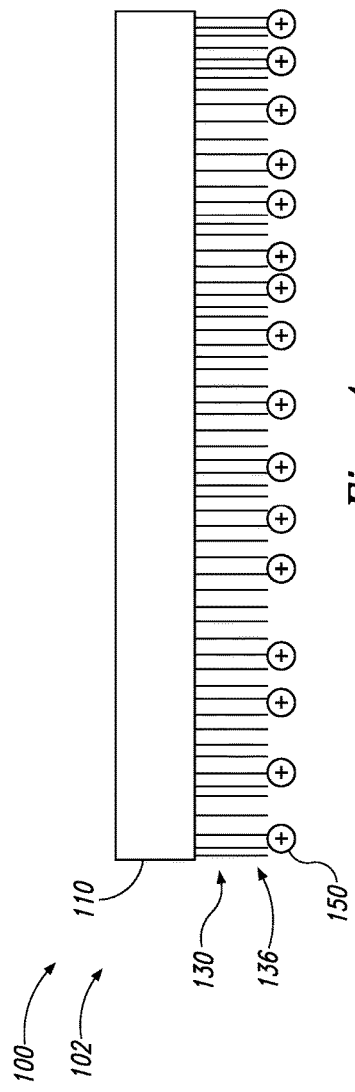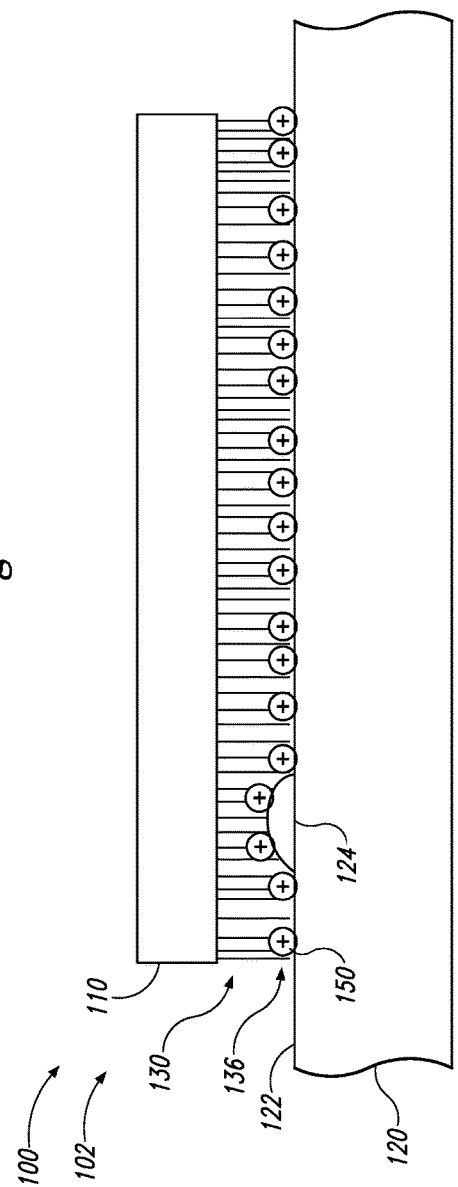

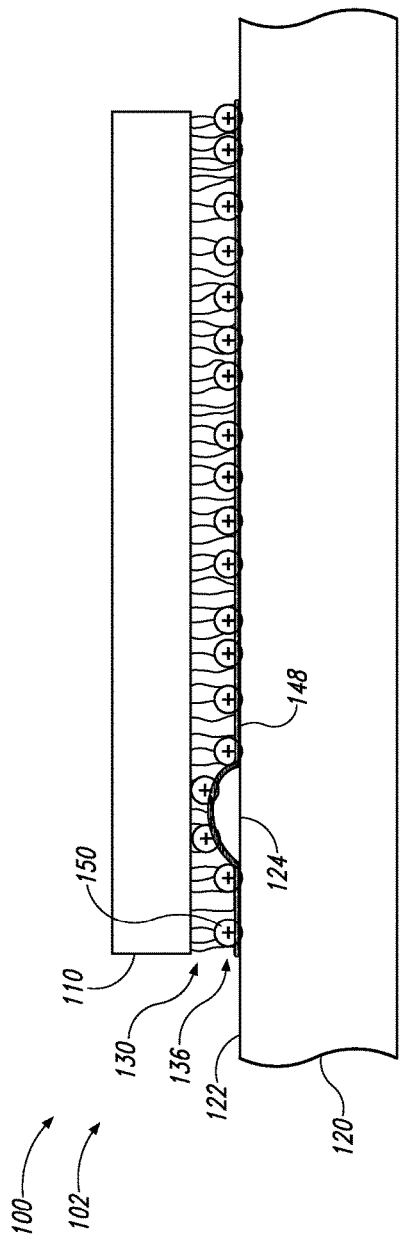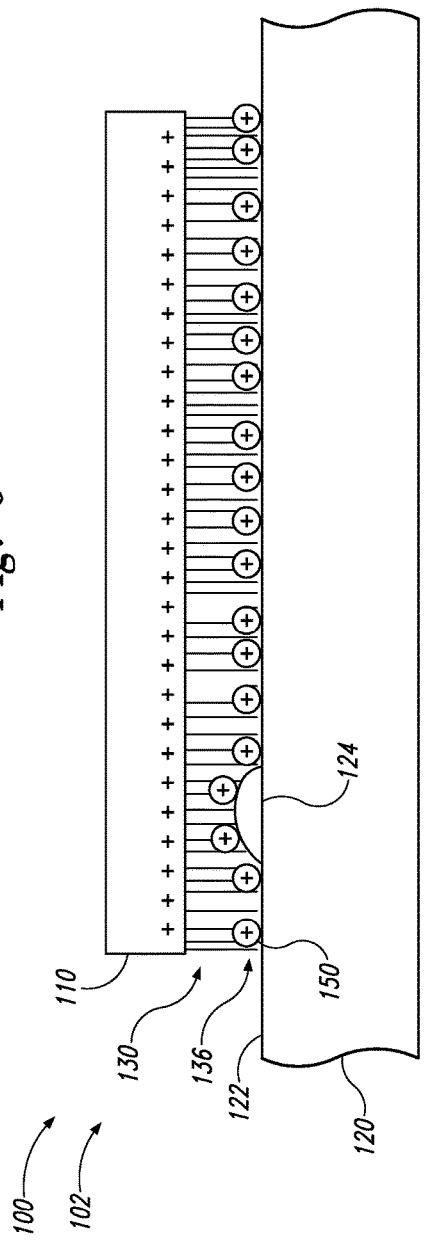

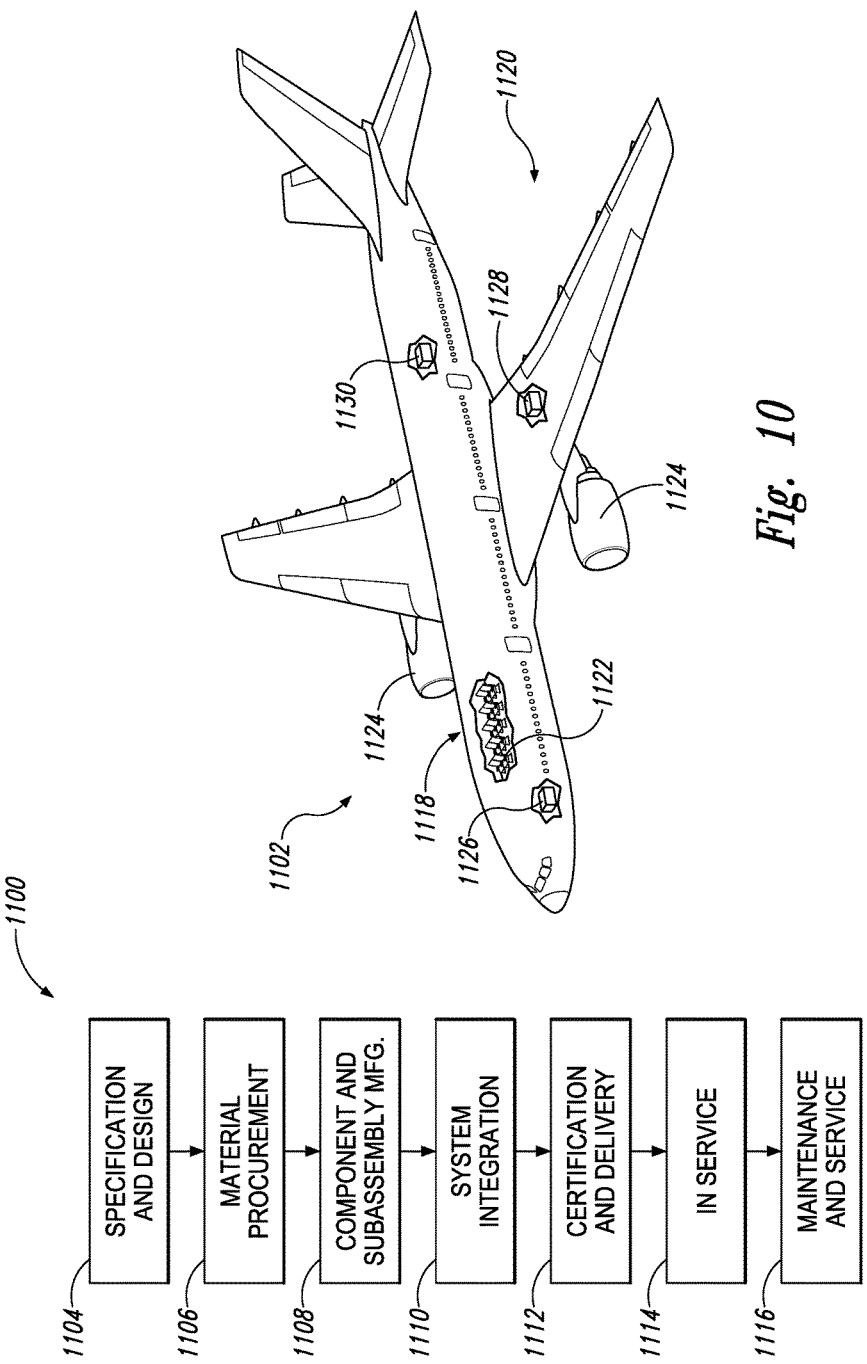

ELECTRONICALLY REVERSIBLE ADHESIVE SYSTEMS

TECHNICAL FIELD

The present disclosure relates to electronically reversible adhesive systems and methods.

BACKGROUND

One type of adhesive is a dry adhesive, which binds two surfaces or objects together without being required to flow and wet to the adherend, as do adhesives such as glues, cements, and sealants. Dry adhesive may exploit an aggregate van der Waals force between the dry adhesive and the contact surface when the adhesive is in intimate contact with the contact surface.

Van der Waals forces are short-range intermolecular forces, i.e., forces between molecular entities, other than those due to chemical bonds or due to electrostatic interactions with ions or ionic groups. Van der Waals forces include attractive forces due to the electrical attraction between permanent and/or induced dipoles of the molecules. Van der Waals forces are weak compared to chemical bonds and are negligible at separation distances greater than about 1 nm (nanometer). Hence, van der Waals forces between solid-phase molecules only occur upon intimate contact (less than about 1 nm) between molecules.

Though van der Waals forces are weak, the aggregate total of van der Waals forces between solid surfaces may be macroscopically significant, provided that there is sufficiently intimate contact. Many species of gecko lizards have numerous tiny spatulae on their feet that may come into intimate contact with a surface to form an aggregate van der Waals attractive force, sufficient to permit the gecko lizard to support itself on shear, smooth surfaces (such as vertical glass surfaces). The specialized toe pads of the gecko lizard (and similar structures along the legs of some spiders) inspired dry adhesives based on flexible micro- or nano-structures.

One type of dry adhesive is based on a carbon-nanotube forest. The carbon nanotubes of the forest are a group of carbon nanotubes with aligned longitudinal axes (substantially parallel in a bundle). The carbon-nanotube forest superficially resembles a nanoscale bamboo forest where the carbon nanotubes are the 'trees.' Some carbon-nanotube forests have very thin, long carbon nanotubes, capable of sufficiently conforming to a surface to provide an attractive van der Waals force, exceeding 10 N/cm$^2$ (newtons per square centimeter). Since van der Waals forces between the individual carbon nanotubes and the contact surface fundamentally are contact forces, the total number of atomic contacts and, hence, the contact area, substantially determines the total attractive force between the individual carbon nanotubes and the contact surface.

Intimate contact of the carbon-nanotube-forest adhesive with a surface typically is achieved by compressing such adhesive onto the surface (similar to pressure sensitive adhesive). Once the carbon-nanotube-forest adhesive is in intimate contact with the surface, the adhesive may be removed from the surface by applying an external force that overwhelms the aggregate van der Waals force. Generally, carbon-nanotube-forest adhesives are more resistant to shear forces than to normal forces. Shear forces tend to stress individual van der Waals contacts in parallel while normal forces tend to stress individual van der Waals contacts serially. Hence, normal forces may cause the tips of the carbon nanotubes to peel away one van der Waals contact at a time.

The force to separate a carbon-nanotube-forest adhesive from a surface may be at least as great as the force that can be safely supported by the adhesive. The separation force may be applied manually or may be applied by an actuator. For movable systems, such as use of the adhesive on a robot, an actuator sized to apply the needed separation force may add extra complexity, weight, and power requirements.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an adhesive system for attachment to a contact surface of an object. The adhesive system comprises a backing, carbon nanotubes, charged nanoparticles, and an electrical source. The carbon nanotubes each have a first end region and a second end region, opposite the first end region. Each of the charged nanoparticles is coupled to the second end region of at least one of the carbon nanotubes. The electrical source is configured to selectively electrically charge the backing to cause an electrical repulsion force between the backing and the charged nanoparticles. The first end region of each of the carbon nanotubes is coupled to the backing. Each of the charged nanoparticles has a nanoparticle net electrical charge. Each of the charged nanoparticles has an insulating shell to electrically isolate the nanoparticle net electrical charge at least from the carbon nanotubes. The second end region of each of a number of the carbon nanotubes is coupled to none of the charged nanoparticles.

Another example of the subject matter according to the invention relates to a method of decoupling an adhesive system from a contact surface of an object. The adhesive system has a full adhesive strength in a de-energized state. The adhesive system comprises a backing, carbon nanotubes, each having a first end region, coupled to the backing, and a second end region, opposite the first end region, and charged nanoparticles, each coupled to the second end region of at least one of the carbon nanotubes. The method comprises steps of electrically charging the backing and disengaging the adhesive system from the contact surface. Electrically charging the backing creates an electrical repulsion force between the backing and the charged nanoparticles, so that the full adhesive strength of the adhesive system is decreased to a reduced adhesive strength. Disengaging the adhesive system from the contact surface comprises applying a disengagement force to the adhesive system sufficient to overcome the reduced adhesive strength.

BRIEF DESCRIPTION OF THE DRAWINGS

Figure 1:
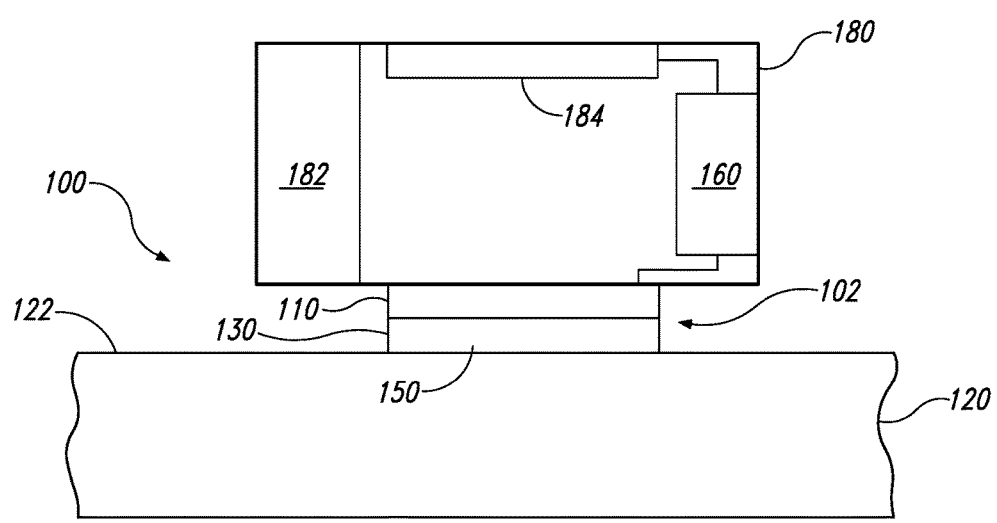
Figure 2:
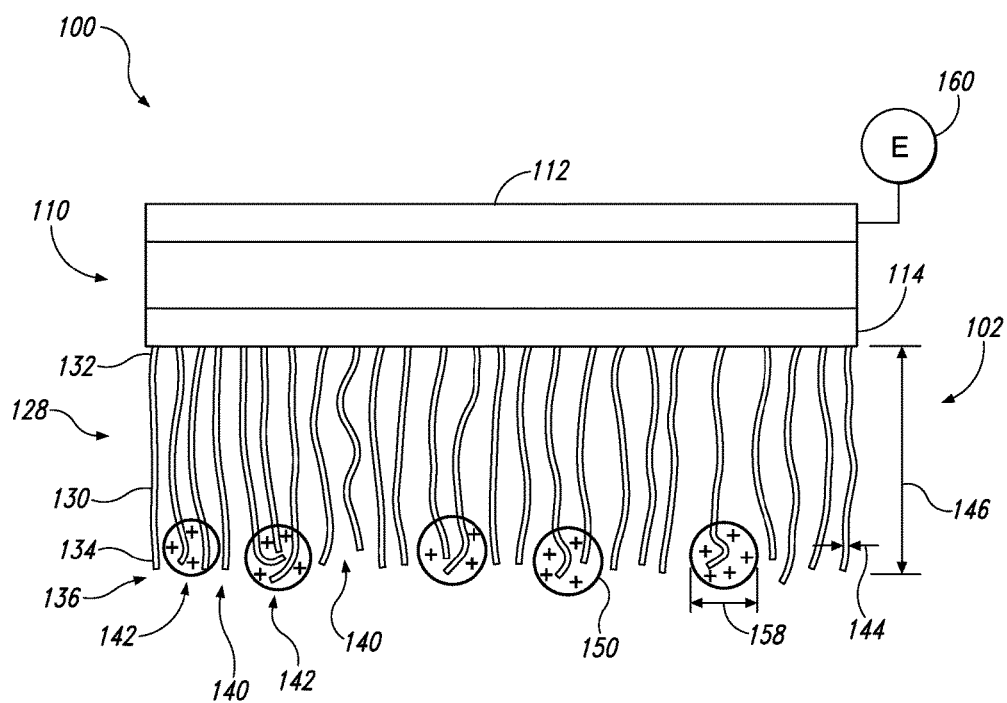
Figure 3:
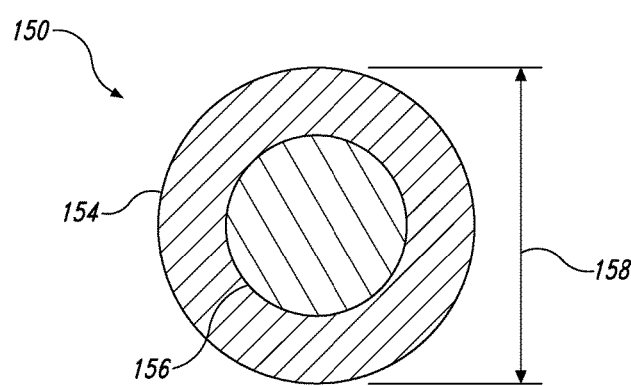
Figure 8:
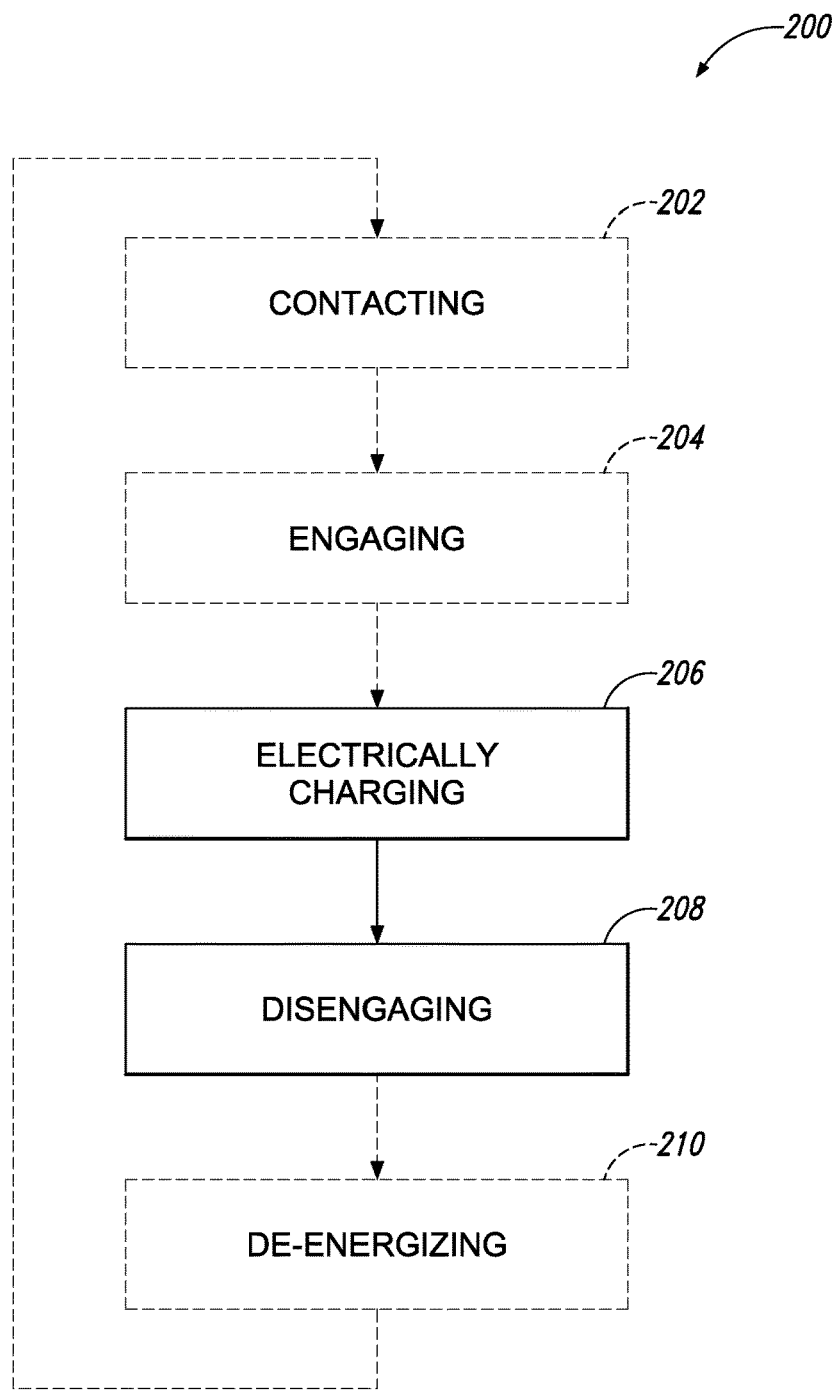

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an adhesive system, according to one or more examples of the present disclosure;

FIG. 2 is a schematic detailed view of an adhesive system, according to one or more examples of the present disclosure;

FIG. 3 is a schematic cross-sectional view of a charged nanoparticle, according to one or more examples of the present disclosure;

FIG. 4 is a schematic diagram of an adhesive system in a de-energized state, according to one or more examples of the present disclosure;

FIG. 5 is a schematic diagram of an adhesive system in an initial contact state, according to one or more examples of the present disclosure;

FIG. 6 is a schematic diagram of an adhesive system in an engaged state, according to one or more examples of the present disclosure;

FIG. 7 is a schematic diagram of an adhesive system in an energized state, according to one or more examples of the present disclosure;

FIG. 8 is a block diagram of a method of operating an adhesive system, according to one or more examples of the present disclosure;

FIG. 9 is a block diagram of aircraft production and service methodology; and

FIG. 10 is a schematic illustration of an aircraft.

DETAILED DESCRIPTION

In FIGS. 1-10, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1-10 may be combined in various ways without the need to include other features described in FIGS. 1-10, other drawing figures, and/or the accompanying disclosure, even though such combination or combinations are not explicitly illustrated herein. Similarly, additional features not limited to the examples presented, may be combined with some or all of the features shown and described herein.

In FIGS. 8-9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8-9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1-7 and particularly to, e.g., FIG. 1, adhesive system 100 for attachment to contact surface 122 of object 120 comprises backing 110, carbon nanotubes 130, charged nanoparticles 150, and electrical source 160. Carbon nanotubes 130 each have first end region 132 and second end region 134, opposite first end region 132. Each of charged nanoparticles 150 is coupled to second end region 134 of at least one of carbon nanotubes 130. Electrical source 160 is configured to selectively electrically charge backing 110 to cause an electrical repulsion force between backing 110 and charged nanoparticles 150. First end region 132 of each of carbon nanotubes 130 is coupled to backing 110. Each of charged nanoparticles 150 has a nanoparticle net electrical charge. Each of charged nanoparticles 150 has insulating shell 154 to electrically isolate the nanoparticle net electrical charge at least from carbon nanotubes 130. Second end region 134 of each of a number of carbon nanotubes 130 is coupled to none of charged nanoparticles 150. The preceding subject matter of this paragraph characterizes example 1 of the present disclosure.

Adhesive system 100 is an electronically reversible dry adhesive system that comprises carbon nanotubes 130 coupled to backing 110 at first end regions 132 and coupled to charged nanoparticles 150 at second end regions 134. Together, backing 110, carbon nanotubes 130, and charged nanoparticles 150 may be referred to as electronic adhesive 102. Carbon nanotubes 130 are arranged as forest 128 of carbon nanotubes 130, with carbon nanotubes 130 arranged in a dense, parallel bundle. Carbon nanotubes 130 have each approximately the same length, have first end regions 132 arranged together (at backing 110) and have second end regions 134 arranged together (at adhesive surface 136). Carbon nanotubes 130 at first end regions 132 may be referred to as the root of forest 128. Carbon nanotubes 130 at second end regions 134 may be referred to as the tip of forest 128.

Carbon nanotubes 130 comprise at least two populations: adherent population 140 of carbon nanotubes 130 and non-adherent population 142 of carbon nanotubes 130. Adherent population 140 is the number of carbon nanotubes 130 that have no charged nanoparticles 150 coupled to second end regions 134. Adherent population 140 comprises carbon nanotubes 130 with second end regions 134 that are uncoupled and free to bind via van der Waals forces to contact surface 122 of object 120. Non-adherent population 142 of carbon nanotubes 130 has second end regions 134 that are coupled to charged nanoparticles 150. Charged nanoparticles 150 generally do not significantly bind to contact surface 122.

Adhesive system 100 is configured to engage (adhere to) contact surface 122 of object 120 and to disengage with (and/or to be removed from) contact surface 122 of object 120. Disengagement and/or removal of adhesive system 100 is electronically controllable with electrical source 160 and by the electrical repulsion force generated between charged nanoparticles 150 and backing 110 (when energized by electrical source 160). Conventional dry adhesives based on forests of carbon nanotubes are typically removed from an object by an external actuator or force that separates the conventional dry adhesive from the object. Because adhesive system 100 may be selectively and electronically disengaged from contact surface 122 of object 120, adhesive system 100 may be operated without an external actuator or without application of an external force. Hence, adhesive system 100 may be associated with no macroscopic moving parts, which may be prone to failure and/or needing maintenance. In some examples, full disengagement and/or removal of adhesive system 100 from contact surface 122 of object 120 may be assisted with force provided by actuator 182 and/or external force (e.g., gravity). However, the force needed for full disengagement and/or removal of adhesive system 100 is less than that needed for a comparable conventional adhesive based on a carbon-nanotube forest.

Adhesive surface 136 is the macroscopic surface formed of second end regions 134 of carbon nanotubes 130 and is adhesive due to adherent population 140 of carbon nanotubes 130. Adhesive surface 136 also is the surface where charged nanoparticles 150 are located (due to non-adherent population 142 of carbon nanotubes 130).

When adhesively bound to contact surface 122, adherent population 140 of carbon nanotubes 130 are in intimate contact 148 with contact surface 122. The net attractive force between adherent population 140 and contact surface 122 due to intimate contact 148 produces a full adhesive strength. Non-adherent population 142 of carbon nanotubes 130 generally do not contribute to adhesive binding to contact surface 122 because charged nanoparticles 150 at second end regions 134 generally do not bind to contact surface 122 and may hinder intimate contact 148 between second end regions 134 of non-adherent population 142 of carbon nanotubes 130 and contact surface 122.

Intimate contact 148 of carbon nanotubes 130 refers to contact between second end regions 134 of adherent population 140 of carbon nanotubes 130 and local sections of contact surface 122 to produce a net attractive van der Waals force between the elements in contact. Some of carbon nanotubes 130 and some of carbon nanotubes 130 of adherent population 140 may not form intimate contact 148 with contact surface 122. Not every one of adherent population 140 of carbon nanotubes 130 may be in intimate contact 148 with contact surface 122 simultaneously. The portion of carbon nanotubes 130 in simultaneous, intimate contact 148 with contact surface 122 contribute to a total adhesive strength of adhesive system 100. Full adhesive strength may be when the portion of carbon nanotubes 130 in simultaneous, intimate contact 148 with contact surface 122 is all or substantially all of adherent population 140, e.g., greater than 70%, greater than 80%, greater than 90%, or greater than 95% of adherent population 140.

Thus, adhesive system 100 may selectively have full adhesive strength when adhesive system 100 is in a de-energized state (FIG. 4; where backing 110 is not energized to produce the electrical repulsion force between backing 110 and charged nanoparticles 150). Adhesive system 100 may selectively have weakened or no adhesive strength when adhesive system 100 is in an energized state (FIG. 7; where backing 110 is energized to produce electrical repulsion force between backing 110 and charged nanoparticles 150).

The electrical repulsion force between backing 110 and charged nanoparticles 150 is substantially perpendicular (normal) to backing 110, adhesive surface 136, and/or contact surface 122. The perpendicular force (as applied by charged nanoparticles 150 at second end regions 134 of carbon nanotubes 130 of non-adherent population 142) tends to peel individual ones of carbon nanotubes 130 of adherent population 140 away from contact surface 122 one van der Waals bond at a time. To the extent that charged nanoparticles 150 are coupled to carbon nanotubes 130 of non-adherent population 142, the electrical repulsion force may include significant shear force components relative to the surface of charged nanoparticles 150. Van der Waals interactions of carbon nanotubes 130 are more resilient to application of shear force than application of perpendicular force. Hence, the same force that may reduce the adhesive strength of adhesive system 100 by substantially separating carbon nanotubes 130 of adherent population 140 from contact surface 122 generally is not sufficient to separate charged nanoparticles 150 from carbon nanotubes 130 of non-adherent population 142.

Individual ones of carbon nanotubes 130 may be single-walled carbon nanotubes (SWNT), double-walled carbon nanotubes (DWNT), or multi-walled carbon nanotubes (MWNT). Carbon nanotubes 130 may comprise one or more types of carbon nanotubes (SWNT, DWNT, MWNT, or combinations thereof). Carbon nanotubes 130 have a very high aspect ratio (length to diameter ratio). For example, carbon nanotubes 130 may have an average length in the range of 1-10,000 µm (microns) and an average diameter in the range of 0.5-50 nm (nanometers). Carbon nanotubes 130 that are thinner, carbon nanotubes 130 with a higher aspect ratio, and/or nanotubes 130 that are more conformal generally are better at forming the intimate contact needed to produce a strong aggregate adhesive strength (relative to thicker, lesser aspect ratio, and/or less conformal nanotubes).

Each of carbon nanotubes 130 is coupled to backing 110 with molecular bonds that are stronger (in aggregate) than van der Waals bonds (in aggregate) of respective one of carbon nanotubes 130 that may form with contact surface 122. Carbon nanotubes 130 may be grown on backing 110, grown on a substrate that forms an integral part of backing 110, and/or chemically bonded to backing 110. Carbon nanotubes 130 may be formed by chemical vapor deposition (CVD), electrospray, and/or solution-based deposition.

Adhesive system 100 may be formed by applying charged nanoparticles 150 to carbon nanotubes 130. Charged nanoparticles 150 may be set into carbon nanotubes 130 by directing charged nanoparticles 150 into carbon nanotubes 130, e.g., by application of pressure and/or an electric field that attracts charged nanoparticles 150 toward backing 110 of adhesive system 100. Charged nanoparticles 150 may be coupled to carbon nanotubes 130 by van der Waals bonds and/or by chemical bonds.

Each of charged nanoparticles 150 has a net electrical charge (positive or negative), also referred to as the nanoparticle net electrical charge. The nanoparticle net electrical charge is a substantially permanent charge embedded in charged nanoparticles 150. Generally, charged nanoparticles 150 each have insulating shell 154 (FIG. 3) that electrically isolates the nanoparticle net electrical charge from the surrounding environment, carbon nanotubes 130, contact surface 122, object 120, and backing 110. Generally, charged nanoparticles 150 each have core 156 to hold the nanoparticle net electrical charge. The nanoparticle net electrical charge generally is on or in core 156. Core 156 may be electrically conductive, metallic, and/or electrically insulating. Generally, conductors and semiconductors distribute charge on the surface of core 156.

Charged nanoparticles 150 (as characterized by average diameter 158) generally are larger than carbon nanotubes 130 (as characterized by average diameter 144) and may be substantially larger than carbon nanotubes 130. For example, average diameter 158 of charged nanoparticles 150 may be 2-10,000 times average diameter 144 of carbon nanotubes 130. Larger ones of charged nanoparticles 150 may hold more nanoparticle net electrical charge (e.g., by having core 156 that is larger) and may provide a larger surface area for coupling carbon nanotubes 130. Smaller charged nanoparticles 150 may have a higher charge density (e.g., by having a higher surface area to volume ratio).

Charged nanoparticles 150 may be formed by forming uncharged nanoparticles and/or cores (e.g., by grinding, milling, solution precipitation, atomization, etc.), applying charges to uncharged nanoparticles and/or cores, and applying an insulating coating to form an insulating shell layer as needed (e.g., by chemical vapor deposition, in situ polymerization, etc.). For example, electrospraying molten material and solidifying the atomized droplets in an insulating environment may produce charged nanoparticles 150 and/or core 156. Additionally or alternatively, uncharged nanoparticles and/or cores may be deposited on a surface, connected to electrical ground, subjected to an electric field to draw charges onto the nanoparticles and/or cores, and then electrically isolated from electrical ground and electrical conductors. Once charged, nanoparticles and/or core 156 may be mechanically displaced from the source of charge and/or transported from the source of charge (e.g., by electric field, air stream, etc.).

Backing 110 is configured to receive electrical charge, also referred to as the backing net electrical charge, from electrical source 160. The backing net electrical charge (net positive or negative charge) received in backing 110 has the opposite sign as the nanoparticle net electrical charge (on each of charged nanoparticles 150). Generally, backing 110 has conductive layer 112 to receive the backing net electrical charge from electrical source 160 and to distribute the backing net electrical charge across the surface area corresponding to where carbon nanotubes 130 are coupled to backing 110. The backing net electrical charge at backing 110 creates an electric field that repels the nanoparticle net electrical charge of charged nanoparticles 150. The repulsion force applied by the electric field is dependent on the distance between the backing net electrical charge and the nanoparticle net electrical charge. For example, the distance may be average length 146 of carbon nanotubes 130 plus any spacing within backing 110 between first end regions 132 of carbon nanotubes 130 (root of forest 128) and a layer of the backing net electrical charge (e.g., conductive layer 112).

Backing 110 may comprise (generally parallel) capacitor plates and conductive layer 112 may be one of the capacitor plates. Backing 110 may comprise auxiliary conductive plate 184 that is spaced away from conductive layer 112 to form the capacitor. A voltage applied between conductive layer 112 and auxiliary conductive plate 184 causes electrical charges of opposite signs to accumulate on opposite ones of conductive layer 112 and auxiliary conductive plate 184. Higher voltages produce larger charge magnitudes and larger charge densities at each of conductive layer 112 and auxiliary conductive plate 184.

Backing 110 may include insulating layer 114 to electrically isolate carbon nanotubes 130 from conductive layer 112 and/or backing net electrical charge applied to backing 110. Carbon nanotubes 130 generally are highly electrically conductive. Without electrical insulation to separate the nanoparticle net electrical charge of charged nanoparticles 150 and the backing net electrical charge applied to backing 110, the backing net electrical charge would flow to the nanoparticle net electrical charge (or vice versa) and potentially neutralize each other.

Backing 110 is coupled to electrical source 160. Electrical source 160 may comprise and/or may be a voltage source, a charge source, a battery, a capacitor, and/or an electrical generator. Electrical source 160 is configured to apply charge to backing 110 by sourcing and/or sinking electrical charges to produce the backing net electrical charge in backing 110. Electrical source 160 may apply a voltage of greater than 20 V (volts), greater than 50 V, greater than 100 V, greater than 500 V, greater than 1,000 V, and/or less than 10,000 V, relative to ground potential and/or relative to the electrical potential of auxiliary conductive plate 184. Higher voltages applied to backing 110 may produce greater repulsion force at charged nanoparticles 150, relative to lower applied voltage. Very high voltages (e.g., greater than 10,000 V) may cause electrical breakdown in insulating media (e.g., air has a breakdown voltage of about 6,000 V/mm (volts per mm)) and/or may cause corona discharge.

Backing 110 may comprise and/or may be coupled to frame 180. For example, adhesive system 100 may be an electronically releasable mounting system (e.g., a perch mechanism) for an unmanned aerial vehicle, an electronic grip for wheeled vehicles, an electronic grip for a robot arm, an electronically controlled anchor point for suspending objects (e.g., a mounting point for a safety harness), or an alternative to 'magnetic boots' for extra-vehicular activities in space. Hence, frame 180 may comprise and/or may be an unmanned aerial vehicle, a wheel, a vehicle, a robot, a grip, a mounting point, a safety harness, a space suit, etc.

Backing 110 may comprise and/or may be, as an option, be coupled to actuator 182, which may be configured to assist decoupling between adhesive system 100 and object 120. Actuator 182 is configured to apply force to separate adhesive system 100 and object 120. For example, actuator 182 may comprise a lever, a spring, a piston, and/or a solenoid.

The following subject matter of this paragraph characterizes example 2 of the present disclosure, wherein example 2 also includes the subject matter according to example 1, above. Referring generally to FIGS. 1-7 and particularly to, e.g., FIG. 2, second end region 134 of each of carbon nanotubes 130 of the number of carbon nanotubes 130 is configured to adhere to contact surface 122 of object 120 by van der Waals forces.

The number of carbon nanotubes 130 (adherent population 140) each has 'free' second end region 134, uncoupled to any charged nanoparticles 150. Second end region 134 of each of carbon nanotubes 130 of adherent population 140 is flexible and conformal enough to form intimate contact 148 with contact surface 122 (e.g., conforming to local contours of contact surface 122). Intimate contact 148 between second end region 134 and contact surface 122 creates a net attractive van der Waals force between second end region 134 and contact surface 122. Second end region 134 of each of carbon nanotubes 130 is flexible and conformable due generally to thin nature of carbon nanotubes 130 (e.g., having a high aspect ratio of average length 146 to diameter 144 as discussed further herein).

The following subject matter of this paragraph characterizes example 3 of the present disclosure, wherein example 3 also includes the subject matter according example 1 or 2, above. Referring generally to FIGS. 1-7 and particularly to, e.g., FIG. 2, each of charged nanoparticles 150 is coupled to second end region 134 of at least one of carbon nanotubes 130 by van der Waals forces.

Second end regions 134 of carbon nanotubes 130 of non-adherent population 142 are flexible and conformal sufficient to form intimate contact 148 with charged nanoparticles 150 (and thereby exert a net attractive van der Waals force). Generally, charged nanoparticles 150 are substantially larger than carbon nanotubes 130 in diameter. A plurality of carbon nanotubes 130 may be coupled to one of charged nanoparticles 150. Second end regions 134 may wrap around charged nanoparticles 150.

In operation, charged nanoparticles 150 that are coupled to carbon nanotubes 130 of non-adherent population 142 remain coupled even while charged nanoparticles 150 are repelled from backing 110. Generally, the adherence of carbon nanotubes 130 to a surface is more resistant to shear forces than normal forces. The electrical repulsion of charged nanoparticles 150 tends to create a shear force to separate charged nanoparticles 150 from carbon nanotubes 130 of non-adherent population 142. The same electrical repulsion of charged nanoparticles 150 pushes contact surface 122 away from backing 110 substantially perpendicular to backing 110 and, thus, tends to create a normal force to separate carbon nanotubes 130 of adherent population 140 from contact surface 122.

The following subject matter of this paragraph characterizes example 4 of the present disclosure, wherein example 4 also includes the subject matter according to any one of examples 1 to 3, above. Referring generally to FIGS. 1-7 and particularly to, e.g., FIG. 2, charged nanoparticles 150 are fewer than carbon nanotubes 130 in number.

The number of carbon nanotubes 130 in adherent population 140 contributes to the adhesive strength of adhesive system 100. Having fewer charged nanoparticles 150 than carbon nanotubes 130 increases the number of carbon nanotubes 130 that are not coupled to at least one of charged nanoparticles 150 (relative to having more charged nanoparticles 150 than carbon nanotubes 130).

The fraction of adhesive surface 136 covered by adherent population 140 contributes to the adhesive strength of adhesive system 100. Charged nanoparticles 150 generally are spread across adhesive surface 136 in substantially a single layer. Charged nanoparticles 150 may block access of some of carbon nanotubes 130 of adherent population 140. Fewer charged nanoparticles 150 contributes to a larger fraction of adhesive surface 136 that is not covered by charged nanoparticles 150 and that is covered by adherent population 140.

The following subject matter of this paragraph characterizes example 5 of the present disclosure, wherein example 5 also includes the subject matter according to any one of examples 1 to 4, above. Referring generally to FIGS. 1-7 and particularly to, e.g., FIGS. 4-7, when adhesive system 100 is in the energized state, backing 110 is electrically charged to repel charged nanoparticles 150 away from backing 110, and when adhesive system 100 is in the de-energized state, backing 110 does not repel charged nanoparticles 150 away from backing 110.

In the energized state, backing 110 is electrically charged by electrical source 160. The backing net electrical charge applied to backing 110 has the opposite sign as the nanoparticle net electrical charge of each of charged nanoparticles 150. The electric field generated by accumulation of the backing net electrical charge on backing 110 repels electrical charge of the same sign and, hence, repels nanoparticle net electrical charge and charged nanoparticles 150.

In the de-energized state, backing 110 is not electrically charged. Backing 110 may have no net charge, insufficient net charge of the same sign as the nanoparticle net electrical charge of each of charged nanoparticles 150, or a net charge of the opposite sign as the nanoparticle net electrical charge of each of charged nanoparticles 150. Hence, backing 110 in the de-energized state may apply no electrical force or an attractive electrical force to charged nanoparticles 150.

Generally, backing 110 may be discharged to transition from the energized state to the de-energized state and may be charged to transition from the de-energized state to the energized state.

The following subject matter of this paragraph characterizes example 6 of the present disclosure, wherein example 6 also includes the subject matter according to example 5, above. Referring generally to FIGS. 1-7 and particularly to, e.g., FIG. 4-7, adhesive system 100 has an adhesive strength that is stronger when adhesive system 100 is in the de-energized state than in the energized state.

In the energized state, backing 110 is electrically charged to generate an electric field that repels charged nanoparticles 150 coupled to non-adherent population 142 of carbon nanotubes 130. Carbon nanotubes 130 of non-adherent population 142 are stretched taught and push contact surface 122 away from backing 110. Carbon nanotubes 130 of adherent population 140 are peeled from intimate contact 148 with contact surface 122 as backing 110 and contact surface 122 separate. Some of carbon nanotubes 130 may have a portion of second end regions 134 remaining in intimate contact 148 but have less intimate contact 148 than before backing 110 is energized. Less intimate contact 148 equates to less adhesive strength. Hence, the adhesive strength of adhesive system 100 in the energized state is less than the adhesive strength of adhesive system 100 in the de-energized state.

The following subject matter of this paragraph characterizes example 7 of the present disclosure, wherein example 7 also includes the subject matter according to any one of examples 1 to 6, above. Referring generally to FIGS. 1-7 and particularly to, e.g., FIG. 2, charged nanoparticles 150 have average diameter 158 that is greater than two times average diameter 144 of carbon nanotubes 130.

Average diameter 158 of charged nanoparticles 150 being larger than average diameter 144 of carbon nanotubes 130 provides more surface area of charged nanoparticles 150 that may be used to bind charged nanoparticles 150 to carbon nanotubes 130. Larger charged nanoparticles 150 may permit more than one of carbon nanotubes 130 to bind to one of charged nanoparticles 150. Average diameter 158 of charged nanoparticles 150 may be greater than 2, greater than 5, greater than 10, greater than 100, or greater than 500 times average diameter 144 of carbon nanotubes 130.

The following subject matter of this paragraph characterizes example 8 of the present disclosure, wherein example 8 also includes the subject matter according to any one of examples 1 to 7, above. Referring generally to FIGS. 1-7 and particularly to, e.g., FIG. 2, charged nanoparticles 150 have average diameter 158 that is less than 1,000 times average diameter 144 of carbon nanotubes 130.

Charged nanoparticles 150 may be smaller than characteristic sizes of particulate 124 that may contaminate contact surface 122. Average diameter 158 of charged nanoparticles 150 may be less than 10,000 or less than 1,000 times average diameter 144 of carbon nanotubes 130.

The following subject matter of this paragraph characterizes example 9 of the present disclosure, wherein example 9 also includes the subject matter according to any one of examples 1 to 8, above. Referring generally to FIGS. 1-7 and particularly to, e.g., FIG. 2, carbon nanotubes 130 are single-walled carbon nanotubes.

Carbon nanotubes 130 may comprise substantially one variety of carbon nanotube. Single-walled carbon nanotubes may be more conformal, may have average diameter 144 that is smaller, and/or may have more uniform properties than multi-walled carbon nanotubes and/or mixtures of different varieties of carbon nanotubes.

The following subject matter of this paragraph characterizes example 10 of the present disclosure, wherein example 10 also includes the subject matter according to any one of examples 1 to 9, above. Referring generally to FIGS. 1-7 and particularly to, e.g., FIG. 2, carbon nanotubes 130 are double-walled carbon nanotubes.

Double-walled carbon nanotubes may be more conformal, may have average diameter 144 that is smaller, and/or may have more uniform properties than multi-walled carbon nanotubes having greater than two walls and/or mixtures of different varieties of multi-walled carbon nanotubes. Carbon nanotubes 130 may include mixtures of single-walled carbon nanotubes and double-walled carbon nanotubes.

The following subject matter of this paragraph characterizes example 11 of the present disclosure, wherein example 11 also includes the subject matter according to any one of examples 1 to 10, above. Referring generally to FIGS. 1-7 and particularly to, e.g., FIG. 2, carbon nanotubes 130 have average length 146 that is greater than 1 μm (micron) and less than 10,000 μm.

Carbon nanotubes 130 may be long and/or substantially longer than average diameter 144 of carbon nanotubes 130. Carbon nanotubes 130 may be longer than average diameter 158 of charged nanoparticles 150, and/or characteristic dimensions of particulate 124 that may contaminate contact surface 122. Longer ones of carbon nanotubes 130 may be more conformal and may have larger second end regions 134 for adhering to other objects than shorter ones of carbon nanotubes 130. Carbon nanotubes 130 that are very long (e.g., with average length 146 greater than 10,000 μm) may become twisted and/or tangled, reducing the number of carbon nanotubes 130 that may be available at adhesive surface 136 for adherent population 140 of carbon nanotubes 130.

The following subject matter of this paragraph characterizes example 12 of the present disclosure, wherein example 12 also includes the subject matter according to example 11, above. Referring generally to FIGS. 1-7 and particularly to, e.g., FIG. 2, average length 146 of carbon nanotubes 130 is greater than 10 μm.

Carbon nanotubes 130 may be substantially longer than average diameter 158 of charged nanoparticles 150. Longer ones of carbon nanotubes 130 may have longer second end regions 134 for adhering to charged nanoparticles 150, particulate 124, and/or contact surface 122.

The following subject matter of this paragraph characterizes example 13 of the present disclosure, wherein example 13 also includes the subject matter according to any one of examples 1 to 12, above. Referring generally to FIGS. 1-7 and particularly to, e.g., FIG. 2, carbon nanotubes 130 have average diameter 144 that is greater than 0.5 nm (nanometer) and less than 50 nm.

Carbon nanotubes 130 may be thin (narrow) and/or may be thin (narrow) enough to fit within local surface variations of contact surface 122, particulate 124, and/or charged nanoparticles 150. Carbon nanotubes 130 that are thinner may be more conformal and/or produce a stronger van der Waals contact than carbon nanotubes 130 that are wider. Carbon nanotubes 130 that are very thin (e.g., with average diameter 144 less than 0.5 nm) tend to lose a defined inner hollow tube and have fewer carbon atoms encircling the circumference of carbon nanotubes 130. Carbon nanotubes 130 that are wide (e.g., with average diameter 144 greater than 50 nm) are stiffer and/or less conformal than carbon nanotubes 130 that are thin. Wider ones of carbon nanotubes 130 are more likely to have more inner walls (e.g., be multi-walled carbon nanotubes) than thinner ones of carbon nanotubes 130.

The following subject matter of this paragraph characterizes example 14 of the present disclosure, wherein example 14 also includes the subject matter according to example 13, above. Referring generally to FIGS. 1-7 and particularly to, e.g., FIG. 2, average diameter 144 of carbon nanotubes 130 is less than 10 nm.

Single-walled carbon nanotubes and double-walled carbon nanotubes typically have an average diameter of less than 10 nm. Fewer inner walls in carbon nanotubes 130 may permit carbon nanotubes 130 to be more conformal than carbon nanotubes 130 with more inner walls.

The following subject matter of this paragraph characterizes example 15 of the present disclosure, wherein example 15 also includes the subject matter according to any one of examples 1 to 14, above. Referring generally to FIGS. 1-7 and particularly to, e.g., FIG. 2, carbon nanotubes 130 have an average aspect ratio of length to diameter that is greater than 1,000 and less than 10,000,000.

Aspect ratios (length to diameter) of carbon nanotubes 130 may be greater than 1,000, greater than 10,000, and/or less than 10,000,000. Carbon nanotubes 130 with a high aspect ratio (e.g., an aspect ratio greater than 1,000) may be more conformal and/or produce a stronger van der Walls contact than carbon nanotubes 130 with a lower aspect ratio. Carbon nanotubes 130 with a very high aspect ratio (e.g., an aspect ratio greater than 10,000,000) may be twisted and/or tangled, reducing the number of carbon nanotubes 130 that may be available at adhesive surface 136 for adherent population 140 of carbon nanotubes 130.

The following subject matter of this paragraph characterizes example 16 of the present disclosure, wherein example 16 also includes the subject matter according to any one of examples 1 to 15, above. Referring generally to FIGS. 1-7 and particularly to, e.g., FIG. 2, carbon nanotubes 130 at backing 110 have a surface density that is greater than $10^8$ CNT/mm² (carbon nanotubes per square millimeter) and less than $10^{12}$ CNT/mm².

Carbon nanotubes 130 generally are densely packed and may have a surface density at backing 110 (i.e., at the root of forest 128) that may be greater than $10^8$ CNT/mm², greater than $10^9$ CNT/mm², greater than $10^{10}$ CNT/mm², greater than $10^{11}$ CNT/mm², and/or less than $10^{12}$ CNT/mm². A high surface density of carbon nanotubes 130 (e.g., a surface density greater than $10^8$ CNT/mm²) may provide more carbon nanotubes 130 for adherent population 140 and non-adherent population 142 than a lower surface density. More carbon nanotubes 130 in adherent population 140 provide a greater potential adhesive strength of adhesive system 100 (relative to fewer carbon nanotubes 130). More carbon nanotubes 130 in non-adherent population 142 provide more net force due to repulsion of charged nanoparticles 150 coupled to carbon nanotubes 130 of non-adherent population 142 (relative to fewer carbon nanotubes 130). Higher surface density of carbon nanotubes 130 may provide a greater adhesive strength per surface area (i.e., surface area of a plane intersecting adhesive surface 136) of adhesive system 100 than lower surface density of carbon nanotubes 130.

The following subject matter of this paragraph characterizes example 17 of the present disclosure, wherein example 17 also includes the subject matter according to any one of examples 1 to 16, above. Referring generally to FIGS. 1-7 and particularly to, e.g., FIG. 2, charged nanoparticles 150 have a surface density that is greater than 100/cm² (per centimeter squared) and less than 10,000,000/cm².

Surface density of charged nanoparticles 150 is the number of charged nanoparticles 150 divided by the surface area of a plane, intersecting adhesive surface 136. Higher surface densities of charged nanoparticles 150 may be associated with charged nanoparticles 150 that are smaller and/or more closely spaced than charged nanoparticles 150 associated with lower surface densities. Charged nanoparticles 150 that are larger may have higher nanoparticle net electrical charge due to larger surface area and/or larger volume of charged nanoparticles 150, relative to smaller ones of charged nanoparticles 150. Higher nanoparticle net electrical charge may lead to a larger force per a single one of charged nanoparticles 150 due to electrical repulsion force generated between charged nanoparticles 150 and backing 110 (when energized by electrical source 160), relative to lower nanoparticle net electrical charge. Larger ones of charged nanoparticles 150 may have insulating shell 154 that is thicker relative to smaller ones of charged nanoparticles 150. Smaller ones of charged nanoparticles 150 may be more evenly distributed across adhesive surface 136 than larger ones of charged nanoparticles 150. Smaller ones of charged nanoparticles 150 may be sufficiently more numerous at adhesive surface 136 to produce a cumulative nanoparticle net electrical charge at adhesive surface 136 that is greater than that obtained with larger ones of charged nanoparticles 150.

The following subject matter of this paragraph characterizes example 18 of the present disclosure, wherein example 18 also includes the subject matter according to any one of examples 1 to 17, above. Referring generally to FIGS. 1-7 and particularly to, e.g., FIG. 2, charged nanoparticles 150 have average diameter 158 that is greater than 4 nm and less than 10 μm.

Smaller ones of charged nanoparticles 150 (e.g., with average diameter 158 less than 10 μm) may have higher surface density at adhesive surface 136 than larger ones of charged nanoparticles 150. Charged nanoparticles 150 typically have average diameter 158 that is greater than average diameter 144 of carbon nanotubes 130. Average diameter 158 of carbon nanotubes 130 that is larger provides more surface area for coupling with second end regions 134 of carbon nanotubes 130, relative to average diameter 158 that is smaller.

The following subject matter of this paragraph characterizes example 19 of the present disclosure, wherein example 19 also includes the subject matter according to example 18, above. Referring generally to FIGS. 1-7 and particularly to, e.g., FIG. 2, average diameter 158 of charged nanoparticles 150 is greater than 10 nm.

Charged nanoparticles 150 may have average diameter 158 that is greater than average diameter 144 of thinner ones of carbon nanotubes 130 (e.g., single-walled carbon nanotubes and/or double-walled carbon nanotubes).

The following subject matter of this paragraph characterizes example 20 of the present disclosure, wherein example 20 also includes the subject matter according to example 18 or 19, above. Referring generally to FIGS. 1-7 and particularly to, e.g., FIG. 2, average diameter 158 of charged nanoparticles 150 is less than 1 μm.

Smaller ones of charged nanoparticles 150 may be more evenly distributed across adhesive surface 136 than larger ones of charged nanoparticles 150. Smaller ones of charged nanoparticles 150 may be sufficiently more numerous at adhesive surface 136 to produce a cumulative nanoparticle net electrical charge at adhesive surface 136 that is greater than that obtained with larger ones of charged nanoparticles 150.

The following subject matter of this paragraph characterizes example 21 of the present disclosure, wherein example 21 also includes the subject matter according to any one of examples 1 to 20, above. Referring generally to FIGS. 1-7 and particularly to, e.g., FIG. 3, nanoparticle net electrical charge of each one of charged nanoparticles 150 has a magnitude of at least $10^{-14}$ C (coulombs) and at most $10^{-2}$ C.

Electrical repulsion force on each of charged nanoparticles 150 is proportional to the nanoparticle net electrical charge on the respective ones of charged nanoparticles 150. A greater charge magnitude produces a greater force per one of charged nanoparticles 150, relative to a lesser charge magnitude. Very high accumulations of nanoparticle net electrical charge (e.g., greater than $10^{-2}$ C) may be difficult to maintain (because of charge leakage through any electrical insulator and/or because of the charge density in a single one of charged nanoparticles 150). Very small accumulations of nanoparticle net electrical charge (e.g., less than $10^{-14}$ C) may not produce sufficient force per a single one of charged nanoparticles 150 to overcome useful levels of adhesive strength.

Generally, sufficient levels of nanoparticle net electrical charge (q) of charged nanoparticles 150 may be determined by the electric field applied by backing 110 (e.g., voltage V), distance (d) between electrical charge in backing 110 (e.g., at conductive layer 112) and charged nanoparticles 150, number (N) of charged nanoparticles 150 distributed across adhesive surface 136, and full adhesive strength (F). More specifically, sufficient nanoparticle net electrical charge (q) substantially follows the relation (where a is a proportionality constant):

$$q \cong \alpha \frac{Fd}{NV}$$

The following subject matter of this paragraph characterizes example 22 of the present disclosure, wherein example 22 also includes the subject matter according to any one of examples 1 to 21, above. Referring generally to FIGS. 1-7 and particularly to, e.g., FIG. 2, charged nanoparticles 150 have a collective charge density, having a magnitude of at least $10^{-12}$ C/cm² (coulombs per square centimeter) and at most 1 C/cm².

Collective charge density is the sum of all nanoparticle net electrical charges of charged nanoparticles 150 divided by the surface area of adhesive surface 136 (the area over which charged nanoparticles 150 are distributed). The total applied force by all charged nanoparticles 150 when subjected to the electric field (the electrical repulsion force) is proportional to the sum of all nanoparticle net electrical charges of charged nanoparticles 150 and the voltage applied by backing 110. The electrical repulsion force needs to be approximately equal to or greater than the adhesive strength of adhesive system 100 to substantially weaken the adhesive strength and/or decouple adhesive system 100 from contact surface 122. Adhesive strength of adhesive system 100 may be greater than 0.1 N/cm² (newton per centimeter squared), greater than 1 N/cm², greater than 10 N/cm², greater than 100 N/cm², and/or less than 10,000 N/cm². The voltage applied by backing 110 may be greater than 20 V, greater than 50 V, greater than 100 V, greater than 500 V, greater than 1,000 V, and/or less than 10,000 V. Hence, collective charge density may be less than 1 C/cm², less than $10^{-2}$ C/cm², less than $10^{-4}$ C/cm², greater than $10^{-12}$ C/cm², greater than $10^{-10}$ C/cm², greater than $10^{-8}$ C/cm², and/or greater than $10^{-6}$ C/cm².

The following subject matter of this paragraph characterizes example 23 of the present disclosure, wherein example 23 also includes the subject matter according to any one of examples 1 to 22, above. Referring generally to FIGS. 1-7 and particularly to, e.g., FIG. 2, carbon nanotubes 130 comprise adherent population 140 of carbon nanotubes 130 that is the number of carbon nanotubes 130 that are coupled to none of charged nanoparticles 150. Furthermore, carbon nanotubes 130 comprise non-adherent population 142 of carbon nanotubes 130 that are coupled to at least one of charged nanoparticles 150. Moreover, a fraction of non-adherent population 142 relative to all carbon nanotubes 130 is greater than 0.1% and less than 90%.

The fraction of non-adherent population 142 may determine the electrical repulsion force relative to the adhesive strength of adhesive system 100. Carbon nanotubes 130 may have only two populations (adherent population 140 and non-adherent population 142) or may be dominated by the two populations such that a larger fraction of one population yields a smaller fraction of the other population. Therefore, a larger fraction of non-adherent population 142 may permit a greater electrical repulsion force and a lower adhesive strength (due to a smaller fraction of adherent population 140). The fraction of non-adherent population 142 also affects surface area of adhesive surface 136 that is adhesive (i.e., the area where carbon nanotubes 130 of adherent population 140 have second end regions 134 that are free and available to adhere to contact surface 122). A larger fraction of non-adherent population 142 limits and/or obscures more of adhesive surface 136 that may adhere to contact surface 122. Performance of adhesive surface 136 may be more uniform across the adhesive surface when adherent population 140 and non-adherent population 142 are distributed relatively uniformly and/or randomly. Very large fractions of non-adherent population 142 (e.g., greater than 90%) may cause adherent population 140 to be distributed irregularly and/or non-uniformly. Very small fractions of non-adherent population 142 (e.g., less than 0.1%) may cause non-adherent population 142 to be distributed irregularly and/or non-uniformly.

The following subject matter of this paragraph characterizes example 24 of the present disclosure, wherein example 24 also includes the subject matter according to example 23, above. Referring generally to FIGS. 1-7 and particularly to, e.g., FIG. 2, the fraction of non-adherent population 142 relative to all carbon nanotubes 130 is less than 10%.

The balance of the electrical repulsion force and the adhesive strength may favor substantially more of adherent population 140 relative to non-adherent population 142.

The following subject matter of this paragraph characterizes example 25 of the present disclosure, wherein example 25 also includes the subject matter according to any one of examples 1 to 24, above. Referring generally to FIGS. 1-7 and particularly to, e.g., FIG. 3, insulating shell 154 of each of charged nanoparticles 150 comprises one or more of dielectric material, semiconductor material, glass, silicon oxide, silicon nitride, surfactant, or polymeric material.

Insulating shell 154 is configured to electrically isolate the nanoparticle net electrical charge of charged nanoparticles 150 from the surrounding environment, carbon nanotubes 130, contact surface 122, object 120, and backing 110. Insulating shell 154 may be an electrical insulator or a semiconductor. Examples of materials for insulating shell 154 include dielectric material, semiconductor material, glass, silicon oxide, silicon nitride, surfactant, polymeric material (e.g., polystyrene, polyethylene, polymethacrylate, polyamide, polytetrafluoroethylene, etc.), and/or combinations thereof. Insulating shell 154 of each of charged nanoparticles 150 may have the same composition.

The following subject matter of this paragraph characterizes example 26 of the present disclosure, wherein example 26 also includes the subject matter according to any one of examples 1 to 25, above. Referring generally to FIGS. 1-7 and particularly to, e.g., FIG. 3, each of charged nanoparticles 150 comprises core 156, which comprises one or more of metal, metal alloy, aluminum, copper, tin, zinc, iron, silver, gold, nickel, ceramic, or polymeric material.

Core 156 may be configured to store the nanoparticle net electrical charge of charged nanoparticles 150. Core 156 may be electrically conductive, metallic, and/or electrically insulating. Examples of materials for core 156 include metal, metal alloy, aluminum, copper, tin, zinc, iron, silver, gold, nickel, ceramic, polymeric material (e.g., polystyrene, polyethylene, polymethacrylate, polyamide, polytetrafluoroethylene, etc.), and/or combinations thereof. Core 156 of each of charged nanoparticles 150 may have the same composition.

The following subject matter of this paragraph characterizes example 27 of the present disclosure, wherein example 27 also includes the subject matter according to any one of examples 1 to 26, above. Referring generally to FIGS. 1-7 and particularly to, e.g., FIG. 2, backing 110 comprises conductive layer 112 that is electrically isolated from carbon nanotubes 130.

Conductive layer 112 is configured to receive backing net electrical charge of backing 110. Backing 110 is configured to contain backing net electrical charge within backing 110. Carbon nanotubes 130 are electrically conductive. Hence, conductive layer 112 is electrically isolated from carbon nanotubes 130 to retain backing net electrical charge within backing 110.

The following subject matter of this paragraph characterizes example 28 of the present disclosure, wherein example 28 also includes the subject matter according to example 27, above. Referring generally to FIGS. 1-7 and particularly to, e.g., FIG. 2, electrical source 160 is electrically connected to conductive layer 112 of backing 110 to apply a voltage to conductive layer 112.

A voltage at conductive layer 112 creates an electric field corresponding to the voltage. The voltage may be configured to repel the nanoparticle net electrical charge of charged nanoparticles 150. The voltage may be relative to earth ground and/or relative to auxiliary conductive plate 184. Electrical source 160 may source and/or sink electrical charges according to the applied voltage to produce the backing net electrical charge in backing 110.

The following subject matter of this paragraph characterizes example 29 of the present disclosure, wherein example 29 also includes the subject matter according to example 28, above. Referring generally to FIGS. 1-7 and particularly to, e.g., FIG. 7, the voltage and the nanoparticle net electrical charge of each one of charged nanoparticles 150 both have either a positive sign or a negative sign.

The sign of the voltage determines the sign of the backing net electrical charge. Like charges (both positive or both negative) repel each other. Hence, if both of backing net electrical charge and nanoparticle net electrical charge have the same sign, charged nanoparticles 150 will be repelled from backing 110 (due to the electrical repulsion force).

The following subject matter of this paragraph characterizes example 30 of the present disclosure, wherein example 30 also includes the subject matter according to example 27, above. Referring generally to FIGS. 1-7 and particularly to, e.g., FIG. 2, electrical source 160 is electrically connected to conductive layer 112 of backing 110 to supply electrical charge to conductive layer 112 of backing 110.

Electrical charge at conductive layer 112 creates an electric field corresponding to the type (positive or negative) and amount of charge. The electrical charge supplied to conductive layer 112 may produce backing net electrical charge. The electrical charge supplied by electrical source 160 may include sourcing and/or sinking electrical charge carriers, such as electrons, by electrical source 160.

The following subject matter of this paragraph characterizes example 31 of the present disclosure, wherein example 31 also includes the subject matter according to example 30, above. Referring generally to FIGS. 1-7 and particularly to, e.g., FIG. 7, the electrical charge and the nanoparticle net electrical charge of each one of charged nanoparticles 150 both have either a positive sign or a negative sign.

Like charges (both positive or both negative) repel each other. Hence, if both of backing net electrical charge and nanoparticle net electrical charge have the same sign, charged nanoparticles 150 will be repelled from backing 110 (due to the electrical repulsion force).

The following subject matter of this paragraph characterizes example 32 of the present disclosure, wherein example 32 also includes the subject matter according to example 30 or 31, above. Referring generally to FIGS. 1-7 and particularly to, e.g., FIG. 2, electrical charge at conductive layer 112 of backing 110 has a surface density that has a magnitude of at least $10^{-12}$ $C/cm^2$ (coulombs per square centimeter) and at most 1 $C/cm^2$.

The total electrical repulsion force applied by all charged nanoparticles 150 to contact surface 122 is proportional to the sum of all nanoparticle net electrical charges of charged nanoparticles 150 and the voltage applied by backing 110 and/or conductive layer 112. The voltage applied by backing 110 and/or conductive layer 112 is related to the type and amount of backing net electrical charge. A larger surface density of electrical charge in backing 110 and/or conductive layer 112 provides a larger amount of backing net electrical charge per surface area and hence creates a larger amount of electrical repulsion force at charged nanoparticles 150 per surface area (all relative to small surface density of electrical charge). The backing net electrical charge and the surface density of the backing net electrical charge may be greater than or about equal to (in magnitude) the respective nanoparticle net electrical charge and the surface density (in adhesive surface 136) of nanoparticle net electrical charge.

The electrical repulsion force needs to be approximately equal to or greater than the adhesive strength of adhesive system 100 to substantially weaken the adhesive strength and/or decouple adhesive system 100 from contact surface 122. The adhesive strength of adhesive system 100 may be 0.1 $N/cm^2$ to 10,000 $N/cm^2$. The electrical charge surface density in backing 110 and/or conductive layer 112 may be less than 1 $C/cm^2$, less than $10^{-2}$ $C/cm^2$, less than $10^{-4}$ $C/cm^2$, greater than $10^{-12}$ $C/cm^2$, greater than $10^{-10}$ $C/cm^2$, greater than $10^{-8}$ $C/cm^2$, and/or greater than $10^{-6}$ $C/cm^2$.

The following subject matter of this paragraph characterizes example 33 of the present disclosure, wherein example 33 also includes the subject matter according to any one of examples 1 to 32, above. Referring generally to FIGS. 1-7 and particularly to, e.g., FIG. 2, backing 110 comprises insulating layer 114.

Insulating layer 114 is configured to electrically isolate backing net electrical charge (e.g., at conductive layer 112) from carbon nanotubes 130 and/or from nanoparticle net electrical charge at each of charged nanoparticles 150.

The following subject matter of this paragraph characterizes example 34 of the present disclosure, wherein example 34 also includes the subject matter according to example 33, above. Referring generally to FIGS. 1-7 and particularly to, e.g., FIG. 2, first end region 132 of each of carbon nanotubes 130 is bound to insulating layer 114 of backing 110.

First end region 132 of each of carbon nanotubes 130 (i.e., root of forest 128) may be bound (e.g., chemically bound) to insulating layer 114 or otherwise coupled to insulating layer 114. Insulating layer 114 may be the exterior layer of the backing that interfaces with carbon nanotubes 130 (at root of forest 128).

The following subject matter of this paragraph characterizes example 35 of the present disclosure, wherein example 35 also includes the subject matter according to any one of examples 1 to 34, above. Referring generally to FIGS. 1-7 and particularly to, e.g., FIG. 2, electrical source 160 is electrically isolated from carbon nanotubes 130.

Carbon nanotubes 130 are electrically conductive. Isolating electrical source 160 from carbon nanotubes 130 prevents carbon nanotubes 130 from conducting current to charged nanoparticles 150 and to backing 110. Mobile electrical charge in carbon nanotubes 130 could neutralize backing net electrical charge and/or nanoparticle net electrical charge if carbon nanotubes 130 are not electrically isolated.

The following subject matter of this paragraph characterizes example 36 of the present disclosure, wherein example 36 also includes the subject matter according to any one of examples 1 to 35, above. Referring generally to FIGS. 1-7 and particularly to, e.g., FIG. 1, electrical source 160 comprises a voltage source.

The voltage source is configured to supply voltage (and source and/or sink electrical charge) to backing 110 and/or conductive layer 112. Examples of voltage sources include a battery, a capacitor, and an electrical generator.

The following subject matter of this paragraph characterizes example 37 of the present disclosure, wherein example 37 also includes the subject matter according to any one of examples 1 to 36, above. Referring generally to FIGS. 1-7 and particularly to, e.g., FIG. 1, electrical source 160 comprises a charge source.

The charge source is configured to provide the backing net electrical charge (by sourcing and/or sinking electrical charge) to backing 110 and/or conductive layer 112. Examples of charge sources include a battery, a capacitor, and an electrostatic generator.

Referring generally to FIGS. 1-8 and particularly to, e.g., FIG. 8, method 200 of decoupling adhesive system 100 from contact surface 122 of object 120 is disclosed. Adhesive system 100 has a full adhesive strength in a de-energized state. Adhesive system 100 comprises backing 110, carbon nanotubes 130, each having first end region 132, coupled to backing 110, and second end region 134, opposite first end region 132, as well as charged nanoparticles 150, each coupled to second end region 134 of at least one of carbon nanotubes 130. Method 200 comprises steps of (block 206) electrically charging backing 110 and (block 208) disengaging adhesive system 100 from contact surface 122. The step of (block 206) electrically charging backing 110 creates an electrical repulsion force between backing 110 and charged nanoparticles 150 so that full adhesive strength of adhesive system 100 is decreased to a reduced adhesive strength. The step of (block 208) disengaging adhesive system 100 from contact surface 122 comprises applying a disengagement force to adhesive system 100 sufficient to overcome the reduced adhesive strength. The preceding subject matter of this paragraph characterizes example 38 of the present disclosure.

Adhesive system 100 is electrically controllable. Generally, use of adhesive system 100 may include one or more cycles of contacting (block 202) adhesive system 100 (when adhesive system 100 is in the de-energized state) to contact surface 122 of object 120, electrically charging (block 206) to weaken the adhesive strength (when adhesive system 100 is in the energized state), disengaging (block 208), and electrically discharging (de-energizing, block 210).

In the de-energized state (FIG. 4), essentially no electrical repulsion force is present (due to lack of backing net electrical charge or a backing net electrical charge that has the opposite sign as nanoparticle net electrical charge of each of charged nanoparticles 150). In the de-energized state, adhesive system 100 may be detached from (not coupled with) object 120 (as shown in the example of FIG. 4), may be in contact with object 120 (as shown in the example of FIG. 5), and/or may be coupled with object 120 (as shown in the example of FIG. 6).

In the de-energized state and with adhesive system 100 detached from object 120, carbon nanotubes 130 of non-adherent population 142 are relaxed, because essentially no electrical repulsion force is present. Carbon nanotubes 130 of adherent population 140 also are relaxed and available to couple to contact surface 122 of object 120. Adhesive system 100 in the de-energized state has the full adhesive strength available.

In the de-energized state and with adhesive system 100 in contact with and/or coupled to object 120, carbon nanotubes 130 of non-adherent population 142 tend to be compressed by presence of contact surface 122. Carbon nanotubes 130 of adherent population 140 may contact and may be in intimate contact 148 with contact surface 122.

When adhesive system 100 is detached from object 120, adhesive system 100 may be placed into initial contact (block 202) with object 120 such that adhesive surface 136 contacts contact surface 122, as shown in FIG. 5 depicting an initial contact state. In the initial contact state, less than the full adhesive strength of adhesive system 100 is achieved between adhesive system 100 and contact surface 122. Carbon nanotubes 130 of adherent population 140 may have some van der Waals bonds with contact surface 122 but not all carbon nanotubes 130 of adherent population 140 have van der Waals bonds with contact surface 122 and/or not all carbon nanotubes 130 of adherent population 140 are fully engaged with contact surface 122.

To complete engagement with contact surface 122, adhesive system 100 and contact surface 122 may be engaged (block 204), i.e., forced together to produce an engaged state, as shown in FIG. 6. Force to cause adhesive system 100 and contact surface 122 to fully engage may be supplied externally (e.g., by gravity, by pressing the components together, etc.) and/or may be created by intermolecular forces at second end region 134 of one or more of carbon nanotubes 130 (as second end region 134 interacts with a local portion of contact surface 122). In the engaged state, adhesive system 100 has a full-adhesive-strength bond with contact surface 122, mediated through intimate contact 148 of second end regions 134 of carbon nanotubes 130 of adherent population 140.

After intimate contact 148 is achieved by engaging (block 204), any force used to cause intimate contact 148 may be released such that only the full adhesive strength due to intimate contact 148 adhesively bonds adhesive system 100 and object 120 together.

From the engaged state, adhesive system 100 may be disengaged (decoupled) from contact surface 122 by electrically charging (block 206) backing 110 to create the electrical repulsion force between backing 110 and charged nanoparticles 150, thus repelling charged nanoparticles 150 away from backing 110 (as shown in FIG. 7, which depicts the energized state). Electrically charging (block 206) may be performed by applying a voltage to backing 110 and/or generating backing net electrical charge with electrical source 160.

As charged nanoparticles 150 are forced away from backing 110 by electrical repulsion force, the distance between contact surface 122 and backing 110 increases (typically by microscopic changes). The electrical repulsion force between charged nanoparticles 150 and backing 110 applies a substantially normal (perpendicular) force to contact surface 122 that tends to peel second end regions 134 of carbon nanotubes 130 (of at least adherent population 140) from contact surface 122 and weakens the total adhesive strength of adhesive system 100. Electrically charging (block 206) weakens the total adhesive strength to the reduced adhesive strength value, which is less than the full adhesive strength and may be null (a zero adhesive strength indicating no adhesive bond between adhesive surface 136 and contact surface 122).

During or after electrically charging (block 206), adhesive system 100 may be disengaged (block 208) from contact surface 122 by applying a sufficient disengagement force. The disengagement force is applied to overcome the reduced adhesive strength achieved by electrically charging (block 206). The disengagement force may be less than what would be necessary to disengage adhesive system 100 from contact surface 122 when adhesively bonded with full adhesive strength. The disengagement force may be provided by gravity or by harnessing other environmental forces (such as due to air currents, water currents, heat, light, etc.). Additionally or alternatively, the disengagement force may be supplied by actuator 182.

After achieving a sufficiently reduced adhesive strength by electrically charging (block 206), backing 110 may be electrically discharged (block 210). Sufficiently reduced adhesive strength is an adhesive strength that is weak enough that disengagement (block 208) may be achieved. Electrically discharging (block 210) may be performed before, during, or after disengaging (block 208) adhesive system 100. Electrically discharging (block 210) may be performed by shunting backing net electrical charge from backing 110 to another conductor and/or to a power source such as electrical source 160. For example, electrical source 160 may supply a voltage and/or charges to backing 110 to electrically charge (block 206) backing 110. Electrical source 160 may be disconnected from backing 110 to permit accumulated charge on backing 110 to dissipate and thereby to electrically discharge (block 210) backing 110. As another example, a voltage may be applied between conductive layer 112 and auxiliary conductive plate 184 to electrically charge backing 110 (i.e., by creating backing net electrical charge at conductive layer 112 and an opposite charge at auxiliary conductive plate 184). Conductive layer 112 and auxiliary conductive plate 184 may be electrically shorted to electrically discharge (block 210) backing 110.

The following subject matter of this paragraph characterizes example 39 of the present disclosure, wherein example 39 also includes the subject matter according to example 38, above. Referring generally to FIGS. 1-8 and particularly to, e.g., FIG. 8, according to method 200, (block 206) adhesive system 100 is in the de-energized state when backing 110 is electrically charged.

Backing 110 is electrically charged (block 206) to produce backing net electrical charge. In the de-energized state, backing 110 has less than the full backing net electrical charge that is needed to create electrical repulsion force and to weaken the adhesive strength of adhesive system 100.

The following subject matter of this paragraph characterizes example 40 of the present disclosure, wherein example 40 also includes the subject matter according to example 38 or 39, above. Referring generally to FIGS. 1-8 and particularly to, e.g., FIG. 8, according to method 200, (block 210) a net neutral charge is established in backing 110 to electrically discharge backing 110.

A net neutral charge permits carbon nanotubes 130 of adherent population 140 to be in a relaxed state because no electrical repulsion force is produced from backing 110.

The following subject matter of this paragraph characterizes example 41 of the present disclosure, wherein example 41 also includes the subject matter according to example 38 or 39, above. Referring generally to FIGS. 1-8 and particularly to, e.g., FIG. 8, according to method 200, (block 210) backing 110 is disconnected from any electrical source 160 to electrically discharge backing 110.

Disconnecting backing 110 from electrical source 160 permits backing net electrical charge to dissipate and thereby reduce or eliminate the electrical repulsion force.

The following subject matter of this paragraph characterizes example 42 of the present disclosure, wherein example 42 also includes the subject matter according to any one of examples 38 to 41, above. Referring generally to FIGS. 1-8 and particularly to, e.g., FIG. 8, according to method 200, the step of (block 206) electrically charging backing 110 comprises creating a backing net electrical charge in backing 110. The backing net electrical charge and a nanoparticle net electrical charge of each of charged nanoparticles 150 both have either a negative sign or a positive sign.

Like charges (both positive or both negative) repel each other. Hence, if both of backing net electrical charge and nanoparticle net electrical charge have the same sign, charged nanoparticles 150 will be repelled from backing 110 (due to the electrical repulsion force).

The following subject matter of this paragraph characterizes example 43 of the present disclosure, wherein example 43 also includes the subject matter according to any one of examples 38 to 42, above. Referring generally to FIGS. 1-8 and particularly to, e.g., FIG. 8, according to method 200, the step of (block 206) electrically charging backing 110 comprises placing charged nanoparticles 150 in an electric field that is sufficiently strong to repel charged nanoparticles 150 from backing 110.

Repelling charged nanoparticles 150 from backing 110 causes the adhesive strength of adhesive system to weaken because charged nanoparticles 150 apply the electrical repulsion force to contact surface 122 to separate contact surface 122 from backing 110.

The following subject matter of this paragraph characterizes example 44 of the present disclosure, wherein example 44 also includes the subject matter according to any one of examples 38 to 43, above. Referring generally to FIGS. 1-8 and particularly to, e.g., FIG. 8, according to method 200, the disengagement force acts in a direction, perpendicular to contact surface 122.

Generally, intimate contact 148 of carbon nanotubes 130 with contact surface 122 is more resistant to shear (parallel) forces than normal (perpendicular) forces, even when intimate contact 148 is reduced by electrically charging (block 206) backing 110. Application of a perpendicular disengagement force (and/or force component) may require a lesser magnitude to achieve disengagement than application of a parallel disengagement force (and/or force component).

The following subject matter of this paragraph characterizes example 45 of the present disclosure, wherein example 45 also includes the subject matter according to any one of examples 38 to 44, above. Referring generally to FIGS. 1-8 and particularly to, e.g., FIG. 8, according to method 200, the disengagement force acts in a direction parallel to contact surface 122.

Application of a parallel disengagement force (and/or force component) may be less prone to inadvertently disengage adhesive system 100 at full adhesive strength, relative to application of a perpendicular disengagement force (and/or force component).

The following subject matter of this paragraph characterizes example 46 of the present disclosure, wherein example 46 also includes the subject matter according to any one of examples 38 to 45, above. Referring generally to FIGS. 1-8 and particularly to, e.g., FIG. 8, method 200 further comprises (block 206) a step of, with adhesive system 100 in the de-energized state and carbon nanotubes 130 in intimate contact 148 with contact surface 122 so that adhesive system 100 is adhered to contact surface 122 with the full adhesive strength, electrically charging backing 110. Method 200 also comprises (block 208) a step of disengaging adhesive system 100 from contact surface 122.

Electrically charging (block 206) is performed when adhesive system 100 is in the de-energized state and in the engaged state (carbon nanotubes 130 are in intimate contact 148 with contact surface 122, as shown in FIG. 6). Hence, electrically charging (block 206) may decrease the full adhesive strength of the engaged state to produce the energized state with reduced adhesive strength.

The following subject matter of this paragraph characterizes example 47 of the present disclosure, wherein example 47 also includes the subject matter according to example 46, above. Referring generally to FIGS. 1-8 and particularly to, e.g., FIG. 8, according to method 200, when adhesive system 100, in the de-energized state, and carbon nanotubes 130 in intimate contact 148 with contact surface 122, adhesive system 100 contacts at least one particulate 124 on contact surface 122 such that at least one particulate 124 precludes at least one of carbon nanotubes 130 of adhesive system 100 from contacting contact surface 122. The step of (block 208) disengaging adhesive system 100 from contact surface 122 comprises disengaging adhesive system 100 from at least one particulate 124 by applying the disengagement force sufficient to overcome the reduced adhesive strength.

Generally, particulate 124 that may contaminate contact surface 122 are adhesively bound by carbon nanotubes 130 in the same manner as contact surface 122. Further, when adhesive system 100 is electrically charged (block 206), carbon nanotubes 130 of adherent population 140 are peeled away from particulate 124 in the same manner as from contact surface 122.

The following subject matter of this paragraph characterizes example 48 of the present disclosure, wherein example 48 also includes the subject matter according to example 47, above. Referring generally to FIGS. 1-8 and particularly to, e.g., FIG. 8, according to method 200, the reduced adhesive strength corresponds to a force that is less than a retention force between particulate 124 and contact surface 122.

When the reduced adhesive strength between carbon nanotubes 130 and particulate 124 corresponds to a force that is less than a retention force between particulate 124 and contact surface 122, particulate 124 will tend to remain on contact surface 122 after disengagement (block 208).

Examples of the present disclosure may be described in the context of aircraft manufacturing and service method 1100 as shown in FIG. 9 and aircraft 1102 as shown in FIG. 10. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals, if present, in the appended claims are presented for illustrative purposes only and are not intended to limit the scope of the claimed subject matter to the specific examples provided in the present disclosure.

What is claimed is:

1. An adhesive system for attachment to a contact surface of an object, the adhesive system comprising:
a backing;
carbon nanotubes, each having a first end region and a second end region, opposite the first end region;
charged nanoparticles, each coupled to the second end region of at least one of the carbon nanotubes; and
an electrical source, configured to selectively electrically charge the backing to cause an electrical repulsion force between the backing and the charged nanoparticles; and wherein:
the first end region of each of the carbon nanotubes is coupled to the backing;
each of the charged nanoparticles has a nanoparticle net electrical charge;
each of the charged nanoparticles has an insulating shell to electrically isolate the nanoparticle net electrical charge at least from the carbon nanotubes; and
the second end region of each of a number of the carbon nanotubes is coupled to none of the charged nanoparticles.

2. The adhesive system according to claim 1, wherein, when the adhesive system is in an energized state, the backing is electrically charged to repel the charged nanoparticles away from the backing, and when the adhesive system is in a de-energized state, the backing does not repel the charged nanoparticles away from the backing.

3. The adhesive system according to claim 2, wherein the adhesive system has an adhesive strength that is stronger when the adhesive system is in the de-energized state than in the energized state.

4. The adhesive system according to claim 1, wherein the charged nanoparticles have an average diameter that is greater than two times an average diameter of the carbon nanotubes.

5. The adhesive system according to claim 1, wherein the carbon nanotubes have an average aspect ratio of length to diameter that is greater than 1,000 and less than 10,000,000.

6. The adhesive system according to claim 1, wherein the charged nanoparticles have a surface density that is greater than $100/cm^2$ (per centimeter squared) and less than $10,000,000/cm^2$.

7. The adhesive system according to claim 1, wherein the charged nanoparticles have an average diameter that is greater than 4 nm and less than 10 μm.

8. The adhesive system according to claim 1, wherein the charged nanoparticles have a collective charge density, having a magnitude of at least $10^{-12}$ $C/cm^2$ (coulombs per square centimeter) and at most 1 $C/cm^2$.

9. The adhesive system according to claim 1, wherein:
the carbon nanotubes comprise an adherent population of the carbon nanotubes that is the number of the carbon nanotubes that each are coupled to none of the charged nanoparticles;
the carbon nanotubes comprise a non-adherent population of the carbon nanotubes that each are coupled to at least one of the charged nanoparticles; and
a fraction of the non-adherent population relative to all the carbon nanotubes is greater than 0.1% and less than 90%.

10. The adhesive system according to claim 9, wherein the fraction of the non-adherent population relative to all the carbon nanotubes is less than 10%.

11. The adhesive system according to claim 1, wherein the insulating shell of each of the charged nanoparticles comprises one or more of dielectric material, semiconductor material, glass, silicon oxide, silicon nitride, surfactant, or polymeric material.

12. The adhesive system according to claim 1, wherein:
each of the charged nanoparticles comprises a core, and
the core comprises one or more of metal, metal alloy, aluminum, copper, tin, zinc, iron, silver, gold, nickel, ceramic, or polymeric material.

13. The adhesive system according to claim 1, wherein the electrical source is electrically isolated from the carbon nanotubes.

14. The adhesive system according to claim 1, wherein the second end region of each of the carbon nanotubes of the number of the carbon nanotubes is configured to adhere to the contact surface of the object by van der Waals forces.

15. The adhesive system according to claim 1, wherein the charged nanoparticles are fewer than the carbon nanotubes in number.

16. The adhesive system according to claim 1, wherein the charged nanoparticles have an average diameter that is less than 1,000 times an average diameter of the carbon nanotubes.

17. The adhesive system according to claim 1, wherein the carbon nanotubes have an average length that is greater than 1 μm (micron) and less than 10,000 μm.

18. The adhesive system according to claim 1, wherein the carbon nanotubes have an average diameter that is greater than 0.5 nm (nanometer) and less than 50 nm.

19. The adhesive system according to claim 1, wherein the carbon nanotubes at the backing have a surface density that is greater than 108 $CNT/mm^2$ (carbon nanotubes per square millimeter) and less than 1012 $CNT/mm^2$.

20. The adhesive system according to claim 1, wherein the nanoparticle net electrical charge of each one of the charged nanoparticles has a magnitude of at least $10^{-14}$ C (coulombs) and at most $10^{-2}$ C.

21. The adhesive system according to claim 1, wherein the backing comprises a conductive layer that is electrically isolated from the carbon nanotubes.

22. The adhesive system according to claim 1, wherein the backing comprises an insulating layer.

* * * * *